United States Patent [19]

Nelson

[11] 4,282,345

[45] Aug. 4, 1981

[54] METHOD OF PREPARING RESINOUS CONDENSATION PRODUCT OF AN ALLYLATED ALKYLOL PHENOL AND AN ETHOXYLINE RESIN

[75] Inventor: John D. Nelson, Pittsfield, Mass.

[73] Assignee: General Electric Company, Pittsfield, Mass.

[21] Appl. No.: 140,687

[22] Filed: Apr. 16, 1980

[51] Int. Cl.$^3$ .............................................. C08G 59/62
[52] U.S. Cl. ...................................... 528/88; 528/89; 528/90; 528/101; 528/104
[58] Field of Search ...................... 528/88, 89, 90, 101

[56] References Cited

U.S. PATENT DOCUMENTS

| | | | |
|---|---|---|---|
| 3,291,770 | 12/1966 | Gaylord et al. | 260/33.4 R |
| 4,220,513 | 9/1980 | Green et al. | 204/159.23 |

*Primary Examiner*—Earl A. Nielsen
*Attorney, Agent, or Firm*—William F. Mufatti

[57] ABSTRACT

A method for preparing a resinous condensation product of an allylated phenol and an ethoxyline resin comprising reacting an allylated phenol with an ethoxyline resin in the presence of an acid catalyst and a compound selected from certain ketones and esters.

12 Claims, No Drawings

METHOD OF PREPARING RESINOUS CONDENSATION PRODUCT OF AN ALLYLATED ALKYLOL PHENOL AND AN ETHOXYLINE RESIN

This invention relates to a method of preparing synthetic resins. More particularly, it relates to a method of preparing a resinous condensation product comprising condensing an ethoxyline resin and an allylated polyalkylol phenol in the presence of an acid catalyst and a compound selected from certain alkyl ketones and alkyl esters.

BACKGROUND OF THE INVENTION

Resinous condensation products of allylated phenolic resins and epoxy resins are known in the art. Thus, U.S. Pat. No. 3,291,770 discloses resins which are the acid catalyzed condensation products of certain ethoxyline resins with allylated polyalkylol phenols or with mixed allylated and non-allylated phenols. These resins, when dissolved in organic solvents, provide excellent coatings, especially for metal substrates. These coatings adhere well to metals and remain flexible, thereby facilitating fabrication of the pre-coated metal into various shapes such as cans, containers, and the like.

However, the prior art methods of producing these resins, as taught in U.S. Pat. No. 3,291,770, are limited to condensing certain ethoxyline resins with allylated polyalkyl phenols in the presence of an acid catalyst and an aliphatic alcohol, wherein the presence of the aliphatic alcohol during the condensation reaction is critical. It would be advantageous to be able to produce these resins by a method wherein the presence of the aliphatic alcohol during the condensation reaction is not necessary. It has now been discovered that these resins can be produced by the acid catalyzed condensation of an ethoxyline resin with an allylated polyalkylol phenol without the presence of the aliphatic alcohol during the condensation reaction.

The organic solvent soluble thermosetting resins produced by the method of the instant invention provide a significant advance over the resins of the prior art wherein cold blends of allylated and non-allylated phenolic and epoxy or ethoxyline resins are cured to provide protective coatings. In coatings made by such prior art cold blending techniques the phenolic and ethoxyline resins are not reacted with each other until the blend of these resins is cured by the application of heat to form insoluble set products. The method of this invention now provides a thermosetting organic solvent soluble resin having both ethoxyline and phenolic components which is formed by the condensation of an allylated phenol component and an ethoxyline resin component. The resulting product is stable and has a long shelf life, and when dissolved in a suitable organic solvent provides a curable coating composition which upon baking produces protective coatings.

DESCRIPTION OF THE INVENTION

The method of the present invention comprises preparing thermosetting, organic solvent soluble resins by the condensation, in the presence of an acid catalyst and a compound selected from certain alkyl ketones, alkyl esters, and mixtures thereof, of an allylated polyalkylol phenol with an ethoxyline resin.

The allylated polyalkylol phenols suitable for use in the method of the instant invention are selected from compounds represented by the general formula:

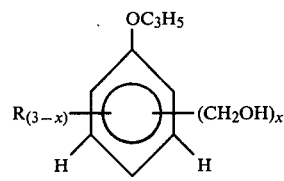

(1)

wherein R represents an alkyl radical, preferably a lower alkyl radical, or hydrogen, and x is a number having a value from 2 to 3 inclusive; and tetramethyloldiallyloxydiphenyl dialkyl methane.

In the instant method only the allylated polyalkylol phenols described above, i.e., those represented by formula 1 and tetramethyloldiallyloxydiphenyl dialkyl methane, may be reacted with the ethoxyline resin, or mixtures of these allylated polyalkylol phenols and non-allylated polyalkylol phenols may be condensed with the ethoxyline resin. These non-allylated polyalkylol phenols are compound represented by the general formula:

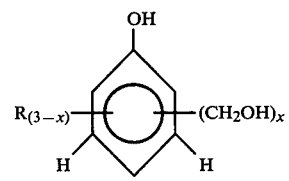

(2)

wherein R and x are as defined above. In the case wherein solely the allylated polyalkylol phenols are used, only one allylated polyalkylol phenol or a mixture of two or more allylated polyalkylol phenols may be utilized.

Generally, the preferred allylated polyalkyl phenol is allylated trimethylol phenol.

In the process of the present invention the allylated polyalkylol phenols are coreacted with the ethoxyline resins. The ethoxyline resins used in the instant process are conventionally prepared by reacting a polyhydric phenol, such as Bisphenol A, with epichlorohydrin. Typical of these ethoxyline resins are the Epon resins such as "Epon 1004", "Epon 1007" and "Epon 1009". The term Epon is a registered trademark used by the Shell Chemical Corporation to designate a class of ethoxyline resins formed by the aforementioned reaction of Bisphenol A and epichlorohydrin. By referring to Epon resins in this specification it is not intended to limit the practice of this invention to only these resins. It is merely intended to refer to these resins as a convenient commercial source of ethoxyline resins preferred in the practice of the process of this invention. Other ethoxyline resins useful in the practice of the method of the present invention and which are commercially available include "Araldite", sold by Ciba Geigy Corp., "Epi-Rez", sold by Jones-Dabney Corp., "Epotif", sold by Reichold Chemical Co., and the Bakelite "ERL" series.

The molecular size and the molecular structure of the ethoxyline resins can be controlled by regulating the proportions of the polyhydric phenol, such as Bisphenol A, and the epichlorohydrin used. High molecular weight solid ethoxyline resins are produced by reacting increased quantities of a polyhydric phenol with lesser quantities of epichlorohydrin. Typical of such high molecular weight ethoxyline resins are the aforementioned "Epon 1004", "Epon 1007", and "Epon 1009".

These high molecular weight ethoxyline resins, as exemplified by "Epon 1004", "Epon 1007"and "Epon 1009"are represented by the general formula:

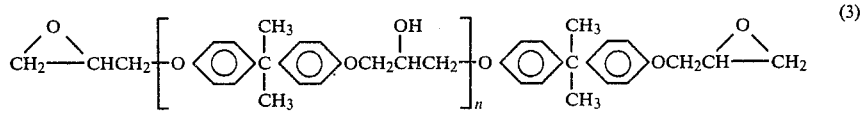 (3)

The number of repeating units in the structure of formula 3 determines the average molecular weight. Generally, the value of n varies from about 3 to about 14. The average molecular weight of useful ethoxyline resins generally ranges from about 1300 to about 4,000, while their epoxide equivalent weight generally ranges from about 95 to about 4,000, preferably from about 870 to about 4,000.

While the structural formula 3 indicates that the ethoxyline resin consists of diepoxy molecules, it is to be understood that the commercially available ethoxyline resins generally do not consist entirely of molecules of a single type. Consequently these commercially available ethoxyline resins are generally not entirely diepoxy resins. Side reactions in the preparation of these resins, such as termination of the chain with a bisphenol molecule instaed of an epichlorohydrin molecule, or conversion of epoxide to glycol, reduce the epoxide content. However, for the sake of convenience, the ethoxyline resins are referred to and shown as diepoxy resins.

The amounts of the reactants, i.e., the ethoxyline resin and the allylated polyalkylol phenol, present in the reaction system are amounts effective for the ethoxyline resin and the allylated polyalkylol phenol to coreact via a condensation type reaction. Generally, this amount ranges, on a weight ratio basis of ethoxyline resin to allylated polyalkylol phenol of from about 1:9 to about 9:1, preferably from about 3:7 to about 7:3.

According to the method of the instant invention the condensation of the ethoxyline resin with the allylated polyalkylol phenol is carried out in the presence of at least one compound selected from certain alkyl ketones, alkyl esters, or mixtures thereof. The alkyl ketones useful in the practice of the instant method are the isobutyl alkyl ketones represented by the general formula:

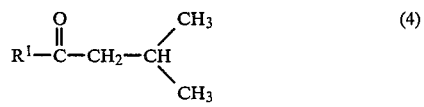 (4)

wherein $R^1$ is an alkyl radical, preferably a lower alkyl radical containing from 1 to about 6 carbon atoms. A particularly preferred isobutyl alkyl ketone represented by formula 4 is methyl isobutyl ketone.

The alkyl esters useful in the instant method are the isobutyl alkyl esters represented by the general formula:

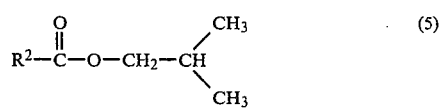 (5)

wherein $R^2$ represents an alkyl radical, preferably a lower alkyl radical containing from 1 to about 6 carbon atoms. A particularly preferred isobutyl alkyl ester represented by formula 5 is isobutyl acetate.

The presence of the ketone of formula 4, the ester of formula 5, or a ketone of formula 4 and an ester of formula 5, during the condensation reaction of the ethoxyline resin with the allylated polyalkylol phenol is critical. In the absence of the ketones of formula 4 or the esters of formula 5 the condensation reaction between the ethoxyline resin and the allylated polyalkylol phenol is generally ineffective. Only one ketone of formula 4 or one ester of formula 5 may be used. Alternately, a mixture of two or more ketones of formula 4 or a mixture of two or more esters of formula 5 may be employed. A mixture of at least one ketone of formula 4 and at least one ester of formula 5 may also be used in the method of the present invention. The amount of ketone and/or ester employed is generally an amount effective to promote the reaction between the ethoxyline resin and the allylated polyalkylol phenol. Preferably the amount of ketone and/or ester used is a solvating amount, that is, an amount effective to act as a solvent for the ethoxyline resin-allylated polyalkylol phenol reaction mixture. An inert diluent such as xylene may also be added to the reaction mixture.

The reaction between the ethoxyline resin and the allylated polyalkylol phenol is further carried out in the presence of an acid catalyst. Generally the acid catalyst may be an organic or an inorganic acid. While acids such as hydrochloric acid and phenol sulphonic acid can be used successfully, a particularly useful acid catalyst is $H_3PO_4$. The amount of the acid present is a catalytic amount, i.e., an amount effective to catalyze the reaction between the ethoxyline resin and the allylated polyalkylol phenol. Generally, this amount ranges, in percent by weight, from about 0.1 percent to about 2 percent, based on the weight of the total combined resin solids.

The reaction conditions existent during the reaction of the ethoxyline resin and the allylated polyalkylol phenol are such as to facilitate and allow the coreaction of the ethoxyline resin and the allylated polyalkylol phenol. Generally, the temperature conditions during the reaction range from about 90 degrees C. to about 140 degrees C. The temperature at which the reaction is carried out is somewhat dependent on the particular solvent or combination of solvents used.

DESCRIPTION OF THE PREFERRED EMBODIMENT

In order to more fully and clearly illustrate the present invention the following specific examples are presented. It is intended that these examples be considered as illustrative rather than limiting the invention disclosed and claimed herein. In the following examples all parts and percentages are on a weight basis unless otherwise specified.

In the examples which follow Methylon 75108 is used as a source of allylated polyalkylol phenol. Methylon 75108 is generally a mixture of allylated mono-, di-, and trimethylol phenol, a major portion of which is allylated trimethylol phenol, and is described in U.S. Pat. No. 2,579,330. Also in the following examples Epon 1007 is used as a source of the ethoxyline resin. Epon 1007 is an ethoxyline resin generally having structural formula 3, an average molecular weight of 2,625, an epoxide equivalent weight of 1,550–2,000, a hydroxyl equivalent weight of 200, a hydroxyl functionality of 13.0, 1.3–1.7 epoxides per mol., a melting point of 127–133, and a viscosity of Y-$Z_1$ on the Gardner-Holdt scale.

EXAMPLE 1

This example illustrates an unsuccessful attempt to coreact an ethoxyline resin with an allylated polyalkylol phenol using as a solvent a ketone other than that represented by formula 4, i.e., a ketone falling outside the scope of formula 4.

525 grams of Epon 1007 are gradually added to a composition containing 179 grams of Methylon 75108, 40 grams of xylene, 410 grams of methyl ethyl ketone, and 3.6 grams of 85% $H_3PO_4$. The resulting composition was refluxed for 7 hours at a temperature of 82–84 degrees C. After refluxing for approximately one hour the resinous solution had a Stroke Cure of 185 seconds at 175 degrees C.; after refluxing for 7 hours the resinous solution had a Stroke Cure of 146 seconds. During this 7 hour reflux period no water of condensation was collected in a StarkeDean trap set up for this purpose. The lack of water of condensation and the very small change in Stroke Cure indicates that no significant degree of condensation of the ethoxyline resin with the allylated polyalkylol phenol has occurred.

EXAMPLE 2

This example illustrates the successul preparation of the thermosetting resin obtained by the coreaction of an ethoxyline resin with an allylated polyalkylol phenol by carrying out the reaction in the presence of methyl isobutyl ketone.

525 grams of Epon 1007 are gradually added to a composition containing 179 grams of Methylon 75108, 40 grams of xylene, 410 grams of methyl isobutyl ketone, and 3.6 grams of 85% $H_3PO_4$. This composition was heated to 109 degrees C. and maintained at reflux for 2.5 hours during which time the water of condensation was collected in a Starke-Dean trap and the reflux temperature rose to 118 degrees C. After refluxing the reaction composition for ½ hour at 109–115 degrees C. it is found to have a Stroke Cure of 137 seconds at 175 degrees C., with 7 grams of water of condensation having been collected in the trap. After further refluxing for an additional 2 hours at 118 degrees C. the reaction composition is found to have a Stroke Cure of 35 seconds, with 13.5 grams of water of condensation having collected in the trap. This indicates that a substantial degree of condensation of the ethoxyline resin with the allylated polyalkylol phenol has occured.

EXAMPLE 3

This example also illustrates the successful preparation of the thermosetting resin obtained by the condensation of an ethoxyline resin with an allylated polyalkylol phenol by carrying out the condensation reaction in the presence of isobutyl acetate.

535 grams of Epon 1007 are gradually added to a composition containing 179 grams of Methylon 75108, 40 grams of xylene, 410 grams of isobutyl acetate, and 3.6 grams of 85% $H_3PO_4$. This reaction composition was heated to 109 degrees C. and maintained at reflux for 3 hours during which time water of condensation was collected in a Starke-Dean trap and the reflux temperature rose to 118 degrees C. After refluxing the reaction composition for 15 minutes at 109–112 degrees C. it is found to have a Stroke Cure of 156 seconds at 175 degrees C., with 3.5 grams of water of condensation having collected in the Starke-Dean trap. After further refluxing at 118 degrees C. for an additional 2.75 hours the reaction composition is found to have a Stroke Cure of 68 seconds, with 11.5 grams of water of condensation having collected in the trap. This indicates that a significant degree of condensation of the ethoxyline resin with the allylated polyalkylol phenol has occurred.

EXAMPLE 4

While, as illustrated by Example 1, methyl ethyl ketone alone is not a suitable promoter for producing a thermosetting resin which is the condensation product of an ethoxyline resin and an allylated polyalkylol phenol, this example illustrates the use of methyl ethyl ketone in combination with an isobutyl alkyl ketone of formula 4 to reduce overall solution viscosity and moderate the reflux reaction period for better process control.

535 grams of Epon 1007 are gradually added to a composition containing 179 grams of Methylon 75108, 40 grams of xylene, 238 grams of methyl isobutyl ketone, 172 grams of methyl ethyl ketone, and 3.6 grams of 85% $H_3PO_4$. This reaction composition was heated to 93 degrees C. and was maintained at reflux for 5½ hours during which time the water of condensation was collected in a Starke-Dean trap and the reflux temperature rose to 97 degrees C. After refluxing the reaction composition for 1 hour at 93–95 degrees C., it is found to have a Stroke Cure of 127 seconds at 175 degrees C., with 2.5 grams of water having collected in the trap. After further refluxing at 95–97 degrees C. for an additional 4½ hours, the reaction composition is found to have a Stroke Cure of 68 seconds C., with 6.5 grams of water of condensation having collected in the trap. This indicates a significant degree of condensation of the ethoxyline resin with the allylated polyalkylol phenol has occurred under a longer reflux period than would be required in the presence of methyl isobutyl ketone alone.

A comparison of Example 1 with Examples 2–3 clearly illustrates the criticallity of carrying out the reaction of the ethoxyline resin with the allylated polyalkylol phenol in the presence of the isobutyl alkyl ketones and/or isobutyl alkyl esters of the present invention. The only difference between the process of Example 1 and the processes of Examples 2 and 3 lies in the type of solvent employed. Thus, while the processes of Examples 2 and 3, which utilize the solvents of the instant invention, are successful in producing a thermosetting resin which is the condensation product of an ethoxyline resin and an allylated polyalkylol phenol, the process of Example 1 wherein methyl ethyl ketone, which falls outside the scope of formulae 4 and 5, is used as the solvent is ineffective in producing this thermosetting condensation product of an ethoxyline resin and an allylated polyalkylol phenol.

Example 4 which, similarly to Examples 2 and 3, illustrates a successful preparation of a thermosetting resinous condensation product of an ethoxyline resin and an allylated polyalkylol phenol, also illustrates the fact that a combination of ketones and/or esters falling outside the scope of formulae 4 and 5 and ketones and/or esters of formuale 4 and 5 can successfully be employed as a solvent/promoter system in this condensation reaction. So long as an amount of ketone and/or ester of the instant invention, i.e., a ketone of formula 4 and/or an ester of formula 5, effective to promote the condensation reaction of the ethoxyline resin with the allylated polyalkylol phenol is present in the reaction system, ketones and/or esters falling outside the scope of formulae 4 and 5 may also be present in the reaction system. Thus a solvent system comprised of a combination of (i) at least one ketone or ester falling outside the scope of formula 4 or 5, and (ii) at least one ketone or ester falling within the scope of formula 4 or 5, may be successfully employed to solvate and promote the condensation reaction of an ethoxyline resin with an allylated polyalkylol phenol.

Although the above examples have shown one embodiment of the present invention, variations thereof are possible in light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. A method of preparing organic solvent soluble thermosetting resins which comprises condensing an ethoxyline resin with an allylated polyalkylol phenol by heating said reactants in the presence of an acid catalyst and a compound selected from the group consisting of isobutyl alkyl ketones, isobutyl alkyl esters, and mixtures thereof.

2. The method according to claim 1 wherein said isobutyl alkyl ketone is selected from compounds represented by the general formula

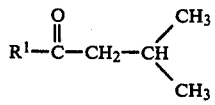

wherein $R^1$ represents a lower alkyl radical.

3. The method according to claim 1 wherein said isobutyl alkyl ester is selected from compounds represented by the general formula

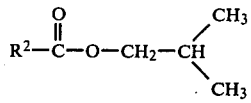

wherein $R^2$ represents a lower alkyl radical.

4. The method according to claim 1 wherein said allylated polyalkylol phenol is selected from the group consisting of compounds represented by the general formula

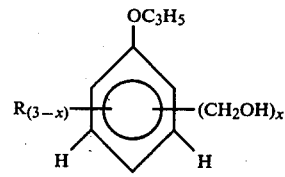

wherein R represents an alkyl radical and x is a number from 2 to 3 inclusive, and tetramethyloldiallyloxydiphenyl dialkyl methane.

5. The method according to claim 4 wherein said ethoxyline resin has an average molecular weight of from about 1,300 to about 4,000, and an epoxide equivalent weight of from about 870 to about 4,000.

6. The method according to claim 5 wherein said ethoxyline resin is represented by the general formula

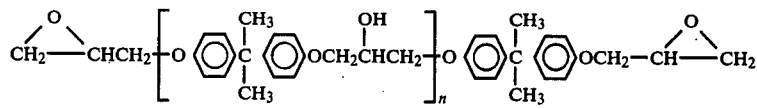

wherein n has a value from 3 to about 14.

7. The method according to claim 6 wherein said isobutyl alkyl ketone is methyl isobutyl ketone.

8. The method according to claim 7 wherein said allylated polyalkylol phenol is allylated trimethylol phenol.

9. The method according to claim 7 wherein said allylated polyalkylol phenol is comprised of a major portion of allylated trimethylol phenol and a minor portion of allylated monomethylol phenol and allylated dimethylol phenol.

10. The method according to claim 6 wherein said isobutyl alkyl ester is isobutyl acetate.

11. The method according to claim 10 wherein said allylated polyalkylol phenol is allylated trimethylol phenol.

12. The method according to claim 10 wherein said allylated polyalkylol phenol is comprised of a major portion of allylated trimethylol phenol and a minor portion of allylated monomethylol phenol and allylated dimethylol phenol.

* * * * *